United States Patent
McFerrin

(10) Patent No.: US 10,433,018 B2
(45) Date of Patent: Oct. 1, 2019

(54) VIDEO PRODUCTION SYSTEM WITH DYNAMIC CHARACTER GENERATOR OUTPUT

(71) Applicant: Tribune Broadcasting Company, LLC, Chicago, IL (US)

(72) Inventor: David McFerrin, Huntsville, AL (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 15/450,225

(22) Filed: Mar. 6, 2017

(65) Prior Publication Data

US 2018/0255364 A1  Sep. 6, 2018

(51) Int. Cl.
*H04N 21/482* (2011.01)
*H04N 21/262* (2011.01)
(Continued)

(52) U.S. Cl.
CPC ... *H04N 21/4825* (2013.01); *H04N 21/26258* (2013.01); *H04N 21/6106* (2013.01);
(Continued)

(58) Field of Classification Search
CPC ......... H04N 21/26258; H04N 21/6125; H04N 21/84; H04N 21/4825; H04N 21/6106;
(Continued)

(56) References Cited

U.S. PATENT DOCUMENTS

| | | | | |
|---|---|---|---|---|
| 6,347,400 B1* | 2/2002 | Ohkura | ............... | H04N 5/44543 348/E5.105 |
| 7,024,681 B1* | 4/2006 | Fransman | .......... | H04N 7/17327 348/E5.008 |

(Continued)

OTHER PUBLICATIONS

International Search Report dated Jun. 21, 2018 issued in connection with International Application No. PCT/US2018/020935, filed on Mar. 5, 2018, 3 pages.
(Continued)

*Primary Examiner* — Hai V Tran
*Assistant Examiner* — Akshay Doshi
(74) *Attorney, Agent, or Firm* — McDonnell Boehnen Hulbert & Berghoff LLP

(57) ABSTRACT

In one aspect, an example method includes (i) accessing a first set of ordered content items and a second set of active/inactive status attributes; (ii) identifying a subset of the first set based on each content item of the subset corresponding to an active status attribute in the second set; (iii) using the content items of the identified subset to generate video content that includes the content items of the identified subset, as ordered in the first set; (iv) determining that a particular content item of the first set satisfies a condition, wherein the particular content item corresponds to a particular active/inactive status attribute of the second set; (v) based on the determination, modifying the particular active/inactive status attribute; and (vi) after modifying the particular active/inactive status attribute, repeating the identifying and using acts, thereby causing modification of the generated video content.

20 Claims, 8 Drawing Sheets

| Content Items | Active/Inactive Status Attribute |
|---|---|
| CONTENT ITEM A | ACTIVE |
| CONTENT ITEM A' | INACTIVE |
| CONTENT ITEM B | ACTIVE |
| CONTENT ITEM B' | ACTIVE |
| CONTENT ITEM C | ACTIVE |
| CONTENT ITEM C' | INACTIVE |
| CONTENT ITEM D | ACTIVE |
| CONTENT ITEM D' | INACTIVE |
| CONTENT ITEM E | ACTIVE |
| CONTENT ITEM E' | INACTIVE |
| CONTENT ITEM F | ACTIVE |
| CONTENT ITEM F' | ACTIVE |

600

(51) Int. Cl.
H04N 21/81 (2011.01)
H04N 21/61 (2011.01)
H04N 21/84 (2011.01)

(52) U.S. Cl.
CPC ....... *H04N 21/812* (2013.01); *H04N 21/8133* (2013.01); *H04N 21/8146* (2013.01); *H04N 21/84* (2013.01)

(58) Field of Classification Search
CPC .......... H04N 21/8146; H04N 21/8133; H04N 21/812
See application file for complete search history.

(56) References Cited

U.S. PATENT DOCUMENTS

| | | | | |
|---|---|---|---|---|
| 10,127,312 | B1* | 11/2018 | Lewis | G06F 16/71 |
| 2008/0008439 | A1* | 1/2008 | Liu | H04N 7/17318 |
| | | | | 386/248 |
| 2009/0240732 | A1* | 9/2009 | Amidon | G11B 27/105 |
| 2009/0254382 | A1 | 10/2009 | Weeks | |
| 2011/0321084 | A1* | 12/2011 | Takahashi | H04N 5/23293 |
| | | | | 725/32 |
| 2012/0110126 | A1* | 5/2012 | Sparks | H04L 67/06 |
| | | | | 709/219 |
| 2013/0218668 | A1 | 8/2013 | Parekh et al. | |
| 2013/0290339 | A1* | 10/2013 | LuVogt | G06Q 10/10 |
| | | | | 707/740 |
| 2014/0244660 | A1 | 8/2014 | Lewis et al. | |
| 2015/0039608 | A1 | 2/2015 | Basilico | |
| 2015/0237393 | A1 | 8/2015 | Hundemer | |

OTHER PUBLICATIONS

Written Opinion of the International Searching Authority dated Jun. 21, 2018 issued in connection with International Application No. PCT/US2018/020935, filed on Mar. 5, 2018, 8 pages.

* cited by examiner

| Story Title | Video Content Item Identifier | Duration | DVE Identifier |
| --- | --- | --- | --- |
| STORY A | VCI ID A | 00:02:00:00 | DVE ID A |
| STORY B | VCI ID B | 00:01:30:00 | |
| STORY C | | 00:00:30:00 | |
| STORY D | VCI ID D | 00:00:30:00 | |
| STORY E | VCI ID E | 00:00:30:00 | |
| COMMERCIAL BREAK | | | |
| STORY F | VCI ID F | 00:02:00:00 | DVE ID F |
| STORY G | | 00:01:30:00 | |
| STORY H | VCI ID H | 00:00:30:00 | |
| STORY I | VCI ID I | 00:00:30:00 | |

Figure 5

| Content Items | Active/Inactive Status Attribute |
|---|---|
| CONTENT ITEM A | ACTIVE |
| CONTENT ITEM A' | INACTIVE |
| CONTENT ITEM B | ACTIVE |
| CONTENT ITEM B' | ACTIVE |
| CONTENT ITEM C | ACTIVE |
| CONTENT ITEM C' | INACTIVE |
| CONTENT ITEM D | ACTIVE |
| CONTENT ITEM D' | INACTIVE |
| CONTENT ITEM E | ACTIVE |
| CONTENT ITEM E' | INACTIVE |
| CONTENT ITEM F | ACTIVE |
| CONTENT ITEM F' | ACTIVE |

Figure 6A

| Content Items | Active/Inactive Status Attribute |
|---|---|
| CONTENT ITEM A | ACTIVE |
| CONTENT ITEM A' | INACTIVE |
| CONTENT ITEM B | ACTIVE |
| CONTENT ITEM B' | ACTIVE |
| CONTENT ITEM C | ACTIVE |
| CONTENT ITEM C' | INACTIVE |
| CONTENT ITEM D | ACTIVE |
| CONTENT ITEM D' | ACTIVE |
| CONTENT ITEM E | ACTIVE |
| CONTENT ITEM E' | INACTIVE |
| CONTENT ITEM F | ACTIVE |
| CONTENT ITEM F' | ACTIVE |

Figure 6B

| Content Items | Active/Inactive Status Attribute |
|---|---|
| CONTENT ITEM A | ACTIVE |
| CONTENT ITEM A' | INACTIVE |
| CONTENT ITEM B | ACTIVE |
| CONTENT ITEM B' | ACTIVE |
| CONTENT ITEM C | ACTIVE |
| CONTENT ITEM C' | ACTIVE |
| CONTENT ITEM D | ACTIVE |
| CONTENT ITEM D' | ACTIVE |
| CONTENT ITEM E | ACTIVE |
| CONTENT ITEM E' | INACTIVE |
| CONTENT ITEM F | ACTIVE |
| CONTENT ITEM F' | ACTIVE |

Figure 6C

| Content Items | Active/Inactive Status Attribute |
|---|---|
| CONTENT ITEM A | ACTIVE |
| CONTENT ITEM A' | INACTIVE |
| CONTENT ITEM B | ACTIVE |
| CONTENT ITEM B' | ACTIVE |
| CONTENT ITEM C | ACTIVE |
| CONTENT ITEM C' | INACTIVE |
| CONTENT ITEM D | ACTIVE |
| CONTENT ITEM D' | ACTIVE |
| CONTENT ITEM E | ACTIVE |
| CONTENT ITEM E' | INACTIVE |
| CONTENT ITEM F | ACTIVE |
| CONTENT ITEM F' | ACTIVE |

VIDEO PRODUCTION SYSTEM WITH DYNAMIC CHARACTER GENERATOR OUTPUT

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) accessing, by a computing system, a first set of ordered content items and a second set of active/inactive status attributes, wherein each content item of the first set corresponds to a respective active/inactive status attribute of the second set, wherein the first set comprises (a) a particular content item that corresponds to a particular active/inactive status attribute of the second set and (b) one or more other content items that respectively correspond to one or more other active/inactive status attributes of the second set; (ii) identifying, by the computing system, a subset of the first set based on each content item of the subset corresponding to an active status attribute in the second set; (iii) using, by the computing system, the content items of the identified subset to generate video content that includes the content items of the identified subset, as ordered in the first set; (iv) based, at least in part, on the one or more other active/inactive status attributes satisfying each condition in a condition set, modifying the particular active/inactive status attribute; and (v) after modifying the particular active/inactive status attribute, repeating, by the computing system, the identifying and using acts, thereby causing modification of the generated video content.

In another aspect, an example non-transitory computer-readable medium is disclosed. The computer-readable medium has stored thereon program instructions that upon execution by a processor, cause performance of a set of acts including (i) accessing, by a computing system, a first set of ordered content items and a second set of active/inactive status attributes, wherein each content item of the first set corresponds to a respective active/inactive status attribute of the second set, wherein the first set comprises (a) a particular content item that corresponds to a particular active/inactive status attribute of the second set and (b) one or more other content items that respectively correspond to one or more other active/inactive status attributes of the second set; (ii) identifying, by the computing system, a subset of the first set based on each content item of the subset corresponding to an active status attribute in the second set; (iii) using, by the computing system, the content items of the identified subset to generate video content that includes the content items of the identified subset, as ordered in the first set; (iv) based, at least in part, on the one or more other active/inactive status attributes satisfying each condition in a condition set, modifying the particular active/inactive status attribute; and (v) after modifying the particular active/inactive status attribute, repeating, by the computing system, the identifying and using acts, thereby causing modification of the generated video content.

In another aspect, an example computing system is disclosed. The computing system is configured for performing a set of acts including (i) accessing, by the computing system, a first set of ordered content items and a second set of active/inactive status attributes, wherein each content item of the first set corresponds to a respective active/inactive status attribute of the second set, wherein the first set comprises (a) a particular content item that corresponds to a particular active/inactive status attribute of the second set and (b) one or more other content items that respectively correspond to one or more other active/inactive status attributes of the second set; (ii) identifying, by the computing system, a subset of the first set based on each content item of the subset corresponding to an active status attribute in the second set; (iii) using, by the computing system, the content items of the identified subset to generate video content that includes the content items of the identified subset, as ordered in the first set; (iv) based, at least in part, on the one or more other active/inactive status attributes satisfying each condition in a condition set, modifying the particular active/inactive status attribute; and (v) after modifying the particular active/inactive status attribute, repeating, by the computing system, the identifying and using acts, thereby causing modification of the generated video content.

BRIEF DESCRIPTION OF THE DRAWINGS

FIG. 5 is a simplified block diagram of an example program schedule.

FIG. 6A is a simplified block diagram of example content data.

FIG. 6B is another simplified block diagram of example content data.

FIG. 6C is another simplified block diagram of example content data.

FIG. 6D is another simplified block diagram of example content data.

DETAILED DESCRIPTION

I. Overview

Figure 1:
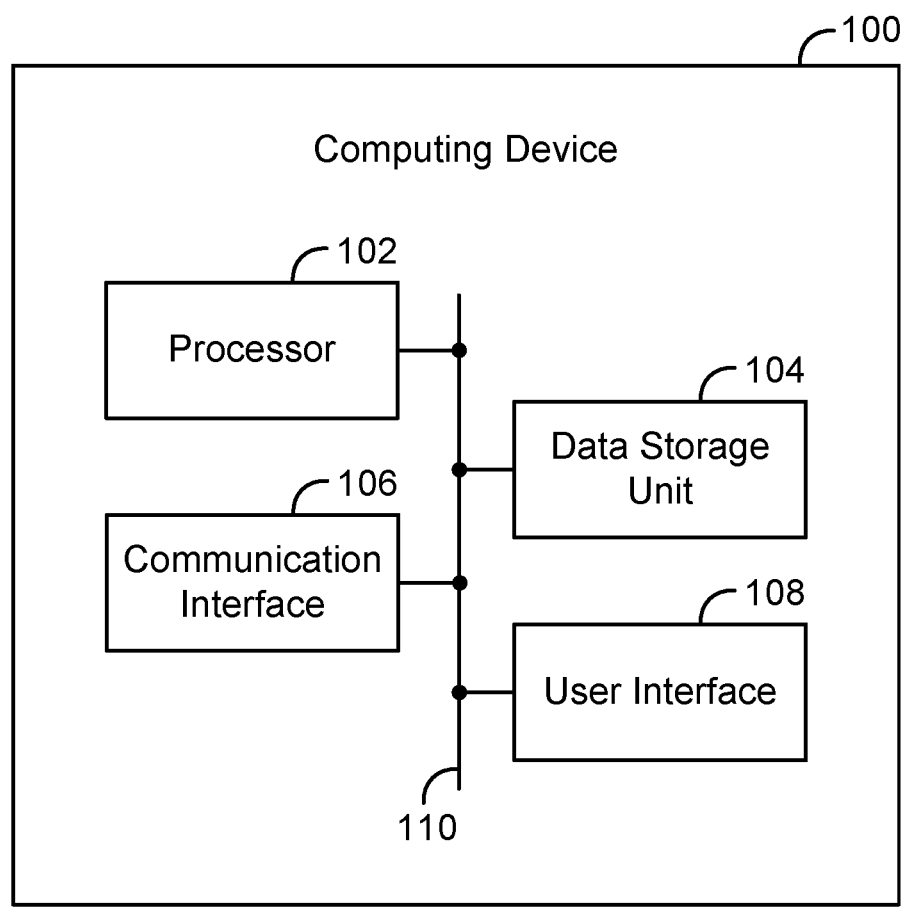
FIG. 1 is a simplified block diagram of an example computing device.

A video-production system (VPS) can generate video content that can serve as or be part of a video program (e.g., a news program). The VPS can then transmit the video content to a video-broadcast system (VBS), which in turn can transmit the video content to an end-user device for presentation of the video content to an end-user.

The VPS can include various components to facilitate generating video content. For example, the VPS can include a video source, a digital video-effect (DVE) system, a scheduling system, and a sequencing system. The video source can generate video content, and can transmit the video content to the DVE system. The DVE system can use the video content and a DVE template to execute a DVE, which can cause the DVE system to generate new video content that is a modified version of the received video content. For example, the generated video content can include the received video content with local weather content overlaid thereon.

The scheduling system can create a program schedule, perhaps based on input received from a user (e.g., a producer or technical director) via a user interface. The sequencing system can process records in the program schedule, and based on the processed records, can control one or more components of the VPS, such as the video source and the DVE system, to facilitate generating video content.

In one example, the VPS can also include an election system and a character generator. The election system can obtain election data, and the character generator can then use the election data to generate video content that includes the election data (e.g., the generated video content can include a graphical depiction of the information represented by the election data, such as characters and/or graphics that depict election tallies, ongoing races, results, projected outcomes, etc.). The character generator can also receive advertisement data and can use the advertisement data to include advertisements in addition to the election data in the generated video content. Further, the character generator can transmit the video content to the DVE system. The DVE system can receive the video content and can execute a DVE, which causes the DVE system to generate video content that includes the received video content and thus, that also includes the election data and the advertisements. The generated video content can serve as or be part of a video program. Thus, in this way, the VPS can integrate election data into a video program.

The video content generated by the character generator can take various forms. In some examples, the generated video content can present a number of content items in a sequential order. For instance, the election data can include a number of content items arranged sequentially in a certain file format (e.g., an XML file), and the character generator can generate the video content presenting the content items in their sequential order.

In some instances, it can be desirable to modify the generated video content during production of the video program. For example, in order to maintain an appropriate balance between the amount of election data and the number of advertisements included in the generated video content, it may be desirable to dynamically add or remove advertisements to or from the generated video content. In particular, during an election, if a race becomes significantly lopsided such that viewer interest declines, the generated video content could be modified to remove election data (e.g., vote counts, candidate names, etc.) associated with that race. In such a situation, it could be desirable to also modify the generated video content to remove one or more advertisements in order to maintain a balance between the election data and the advertisements. Moreover, if election data that is excluded from the video program is associated with a race that becomes significantly close such that viewer interest increases, the generated video content can be modified to include that election data. In that situation, it could be desirable to also modify the generated video content to add one or more advertisements in order to maintain the balance between the election data and the advertisements.

One way to modify the generated video content is to modify the election data and advertisement data accessed by the character generator. For example, one or more election data content items or advertisement content items can be added to or removed from the data accessed by the character generator. However, in some systems, adding or removing a content item from the data accessed by the character generator can cause the character generator to restart generation of the video content from the beginning of the sequence of content items. This can be problematic if such a modification is made during production of the video program, as it may result in content items sequentially arranged near the end of the election data being skipped and effectively excluded from the generated video content.

The present disclosure provides a VPS that helps address this issue. In one aspect, content data provided to the character generator can include a first set of content items with each content item including election data or advertisement data. The content data can further include a second set of active/inactive status attributes each corresponding to a respective content item of the first set. The character generator can include or exclude each content item based on its corresponding active/inactive status attribute. The election system can determine whether to modify a particular active/inactive status attribute based on the other active/inactive status attributes satisfying a condition. In one example, this can allow the election system to set a particular status attribute to be "active" or "inactive" in order to increase or decrease a frequency of advertisement content items in the generated video content. Thus, based at least in part on the other active/inactive status attributes satisfying a condition, while the video program is being generated, the election system can modify the particular active/inactive status attribute, thereby modifying the generated video content.

As a result, one or more content items can be added or removed from the generated video content without adding or removing content items from the election data accessed by the character generator. For instance, the character generator and/or associated DVE systems can generate video content that includes a repeating sequence of the election data and advertisements, and each subsequent generation can either include or not include a given advertisement content item depending on the current corresponding status attribute for that advertisement content item. As such, advertisement content items can be added and/or removed from the sequence in order to maintain an appropriate balance between the election data and the advertisements without restarting the generation of video content from the beginning of the sequence of content items.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another other entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Video System

Figure 2:
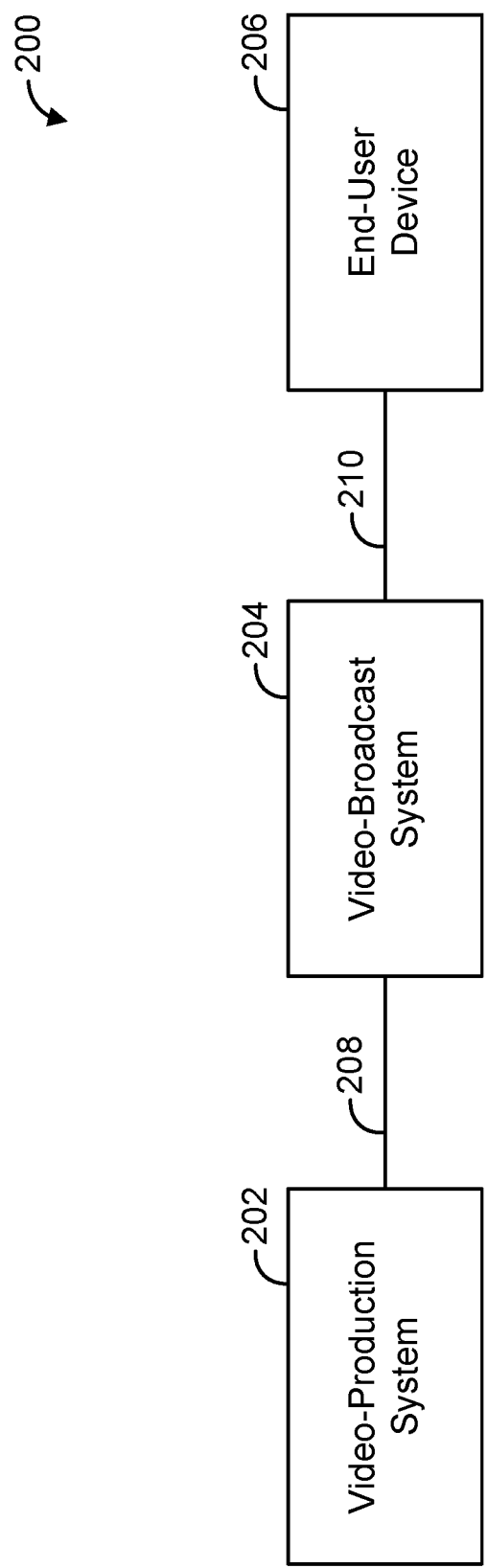
FIG. 2 is a simplified block diagram of an example video system.

FIG. 2 is a simplified block diagram of an example video system 200. The video system 200 can perform various acts and/or functions related to video content, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
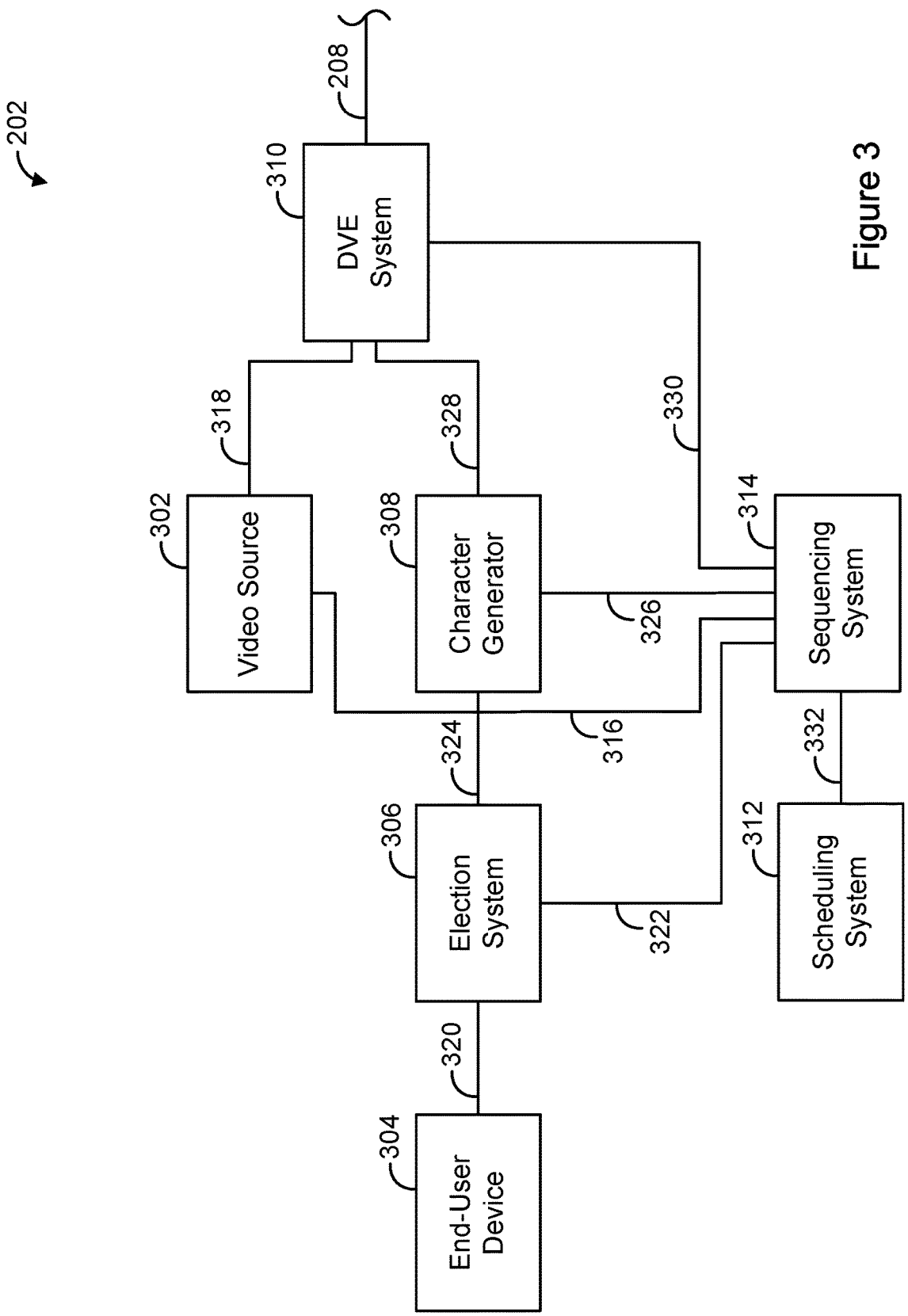
FIG. 3 is a simplified block diagram of an example video production system.

FIG. 3 is a simplified block diagram of an example VPS 202. The VPS 202 can include various components, such as a video source 302, an end-user device 304, an election system 306, a character generator 308, a digital video-effect (DVE) system 310, a scheduling system 312, and a sequencing system 314, each of which can be implemented as a computing system. The VPS 202 can also include a connection mechanism 316, which connects the video source 302 with the sequencing system 314; a connection mechanism 318, which connects the video source 302 with the DVE system 310; a connection mechanism 320, which connects the end-user device 304 with the election system 306; a connection mechanism 322, which connects the election system 306 with the sequencing system 314; a connection mechanism 324, which connects the election system 306 with the character generator 308; a connection mechanism 326, which connects the character generator 308 with the sequencing system 314; a connection mechanism 328, which connects the character generator 308 with the DVE system 310; a connection mechanism 330, which connects the DVE system 310 with the sequencing system 314; and a connection mechanism 332, which connects the scheduling system 312 with the sequencing system 314.

The video source 302 can take various forms, such as a video server, a video camera, a satellite receiver, a character generator, or a DVE system. An example video server is the K2 server provided by Grass Valley of San Francisco, Calif.

The character generator 308 can take various forms. An example character generator is the VIZ TRIO provided by Viz Rt of Bergen, Norway. Another example character generator is CASPAR CG developed and distributed by the Swedish Broadcasting Corporation (SVT).

The DVE system 310 can take various forms, such as a production switcher. An example production switcher is the VISION OCTANE production switcher provided by Ross Video Ltd. of Iroquois, Ontario in Canada.

The scheduling system 312 can take various forms. An example scheduling system is WO TRAFFIC provided by WideOrbit, Inc. of San Francisco, Calif. Another example scheduling system is OSI-TRAFFIC provided by Harris Corporation of Melbourne, Fla.

The sequencing system 314 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system.

Each of the video-based entities described in this disclosure can include or be integrated with a corresponding audio-based entity. Also, the video content described in this disclosure can include or be integrated with corresponding audio content.

III. Example Operations

The video system 200 and/or components thereof can perform various acts and/or functions. These features and related features will now be described.

The video system 200 can perform various acts and/or functions related to video content. For example, the video system 200 can receive, generate, output, and/or transmit video content that can serve as or be part of a video program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring back to FIG. 3, within the VPS 202, the video source 302 can generate and/or output video content, and can transmit the video content to another entity, such as the DVE system 310. In practice, the VPS 202 is likely to include multiple video sources and corresponding connection mechanisms, each connecting a respective one of the video sources with the DVE system 310.

As noted above, the video source 302 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server playing out the video content. The video server 302 can then transmit the video stream, thereby transmitting the video content, to another entity, such as the DVE system 310.

The end-user device 304 and the election system 306 can perform various acts and/or functions related to obtaining, processing, and/or outputting election data. In this disclosure, the term "election" means any type of vote-based decision-making process. In one example, an election can involve a process where voters vote to determine which candidate obtains a political office. In another example, an election may involve a ballot-initiative process where voters vote to determine whether or not a proposed law becomes law.

Election data can be provided by various sources, such as from a government-operated reporting system, and can take various forms. Election data can indicate various types of information about an election, such as a title of a political office that is the subject of the election, a name and other information of a candidate, an amount of votes cast and/or tabulated for a candidate, an amount and an identification of precincts or other zones reporting tabulated votes, and/or a projection outcome.

The election system 306 can receive election data and can do so in various ways. For example, the election system can receive election data by obtaining it from another entity, such as the end-user device 304.

The election system 306 can also store, select, and/or retrieve election data, perhaps based on input received from a user (e.g., a producer or technical director) via a user interface. As such, the election system 306 can store obtained election data in a data storage unit (e.g., a data storage unit of the election system 306), and can then receive the election data by selecting and retrieving it from the data storage unit. The election system 306 can also modify election data and can do so in various ways.

The election system 306 can also transmit election data to another entity, such as the character generator 308.

The character generator 308 can use a character generator template and content to generate and/or output video content that includes the content. The character generator template specifies the manner in which the character generator 308 uses the content to generate and/or output the video content. The character generator 308 can create and/or modify a character generator template, perhaps based on input received from a user via a user interface. Further, the character generator 308 can store, select, and/or retrieve a character generator template, perhaps based on input received from a user via a user interface. As such, the character generator 308 can store a character generator template in a data storage unit (e.g., a data storage unit of the character generator 308), and can then receive the character generator template by retrieving it from the data storage unit.

The character generator 308 can also receive content in various ways. For example, the character generator 308 can receive content by receiving it from another entity, such as the election system 306. In another example, the character generator 308 can receive content by selecting and retrieving it from a data storage unit (e.g., a data storage unit of the election system 306).

The character generator template can specify how the character generator 308 is to receive content. In one example, the character generator template can do so by specifying that the character generator 308 is to receive content on a particular input of the character generator 308 (e.g., an input that maps to a particular entity, such as the election system 306). In another example, the character generator template can do so by specifying that the character generator 308 is to receive content by retrieving it from a particular location of a particular data storage unit (e.g., a data storage unit of the character generator 308).

In one example, the character generator 308 can use an ordered set of content items to generate video content that includes the content items in the specified order. This type of generated video content is sometimes referred to in the industry as a "ticker." The content items can include various types of content, such as text and/or images. In one example, these content items can include election data. The ordered set of content items can be stored in various forms, such as in the form of an Extensible Markup Language (XML) file.

After the character generator 308 generates and/or outputs video content, the character generator 308 can transmit the video content to another entity, such as the DVE system 310, and/or can store the video content in a data storage unit (e.g., a data storage unit of the character generator 308).

As such, in one example, the character generator 308 can receive election data, can use the election data to generate and/or output video content that includes the election data, and can transmit the video content to the DVE system 310.

The DVE system 310 can use a DVE template to generate and/or output video content. This is sometimes referred to in the industry as the DVE system "executing a DVE." In some instances, the DVE system 310 can execute multiple DVEs in serial or overlapping fashion.

The DVE template specifies the manner in which the DVE system 310 generates and/or outputs video content. The DVE system 310 can create and/or modify a DVE template, perhaps based on input received from a user via a user interface. Further, the DVE system 310 can store and/or retrieve a DVE template, perhaps based on input received from a user via a user interface. As such, the DVE system 310 can store a DVE system template in a data storage unit (e.g., a data storage unit of the DVE system 310), and can then receive the DVE template by selecting and retrieving it from the data storage unit.

In some instances, the DVE system 310 can use the DVE template and content to generate and/or output video content that includes the content. The DVE system 310 can receive content in various ways. For example, the DVE system 310 can receive content from another entity, such as the video source 302 and/or the character generator 308. In another example, the DVE system 310 can select and retrieve content from a data storage unit (e.g., a data storage unit of the DVE system 310).

The DVE template can specify how the DVE system 310 is to receive content. In one example, the DVE template can specify that the DVE system 310 is to receive content on a particular input of the DVE system 310 (e.g., an input that maps to a particular entity, such as the video source 302 or the character generator 308). In another example, the DVE template can specify that the DVE system 310 is to receive content by retrieving it from a particular location of a particular data storage unit (e.g., a data storage unit of the DVE system 310).

A DVE template can be configured in various ways, which can allow the DVE system 310 to execute various types of DVEs. In one example, a DVE template can specify that the DVE system 310 is to receive video content from the video source 302 and other content (e.g., local weather content) from a data storage unit of the DVE system, and is to overlay the other content on the video content, thereby generating a modified version of the video content. As such, in one example, the DVE system 310 can generate video content by modifying video content.

Figure 4A:
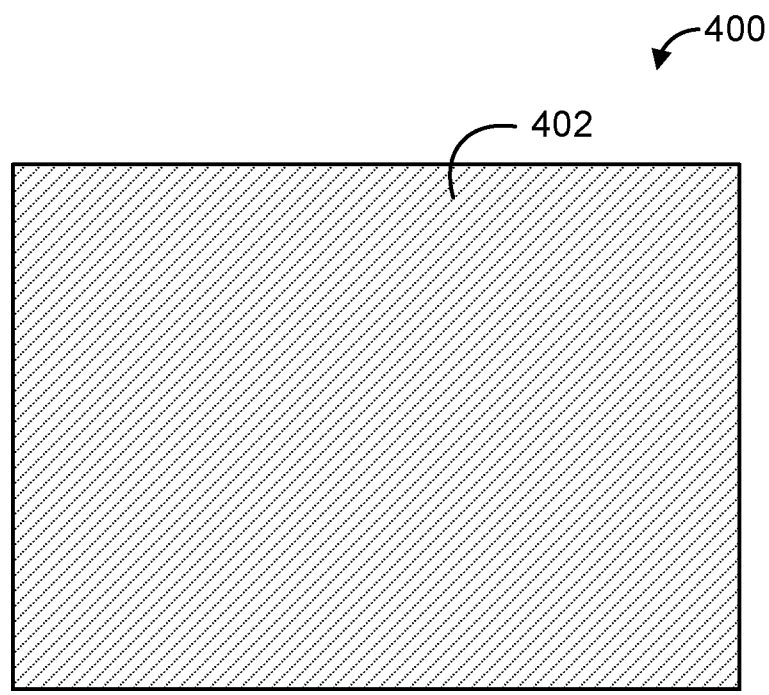
FIG. 4A is a simplified diagram of an example frame of video content, without content overlaid thereon.
Figure 4B:
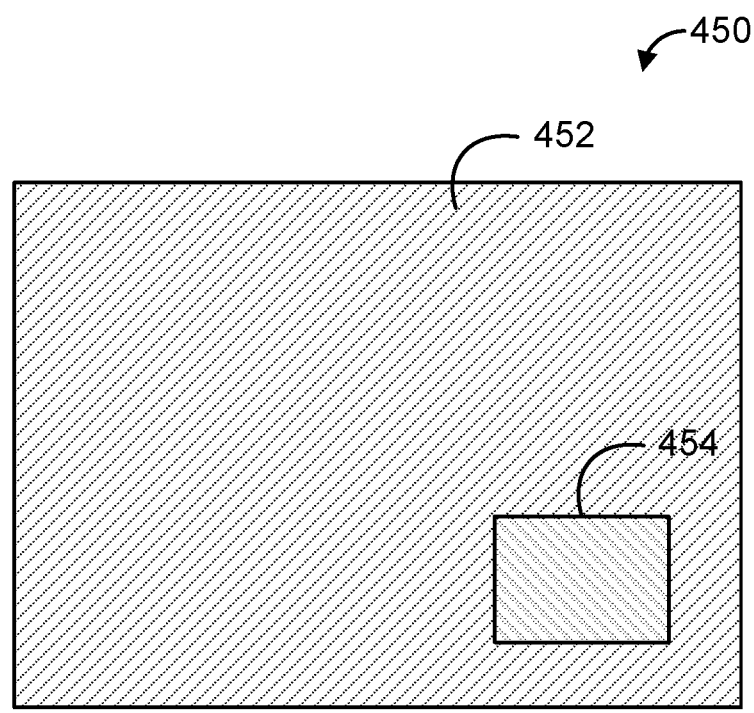
FIG. 4B is a simplified diagram of an example frame of video content, with content overlaid thereon.

FIGS. 4A and 4B help illustrate this concept of overlaying other content on video content. FIG. 4A is a simplified depiction of an example frame 400 of video content. Frame 400 includes content 402, but does not include other content overlaid on content 402. For comparison, FIG. 4B is a simplified depiction of another example frame 450 of video content. Frame 450 includes content 452 and other content 454 overlaid on content 452.

In another example, a DVE template can specify that the DVE system 310 is to receive first video content from the video source 302 and second video content from the character generator 308, and is to overlay the second video content on the first video content, thereby generating a modified version of the first video content.

In another example, a DVE template can specify that the DVE system 310 is to receive first video content from the video source 302 and second video content from the character generator 308, and is to scale-down and re-position the first video content and the second video content, each in a respective one of two windows positioned side-by-side. As such, the DVE system 310 can generate video content by scaling and/or re-positioning video content.

After the DVE system 310 generates and/or outputs the video content, the DVE system 310 can transmit the video content to another entity, such as the VBS 204, or can store the video content in a data storage unit (e.g., a data storage unit of the DVE system 310).

As such, in one example, the DVE system 310 can receive first video content including election data, and can use the first video content to generate and/or output second video content that includes the election data. This is an example way in which the VPS 202 can integrate election data into a video program.

The VPS 202 can also integrate election data into a video program in other ways. For example, in the case where the video source 302 is a video camera, the election system 306 can include a display device that is located within a field of the view of the video camera while the video camera records video content that serves as or is made part of the video program. In one example, the display device can be touch-enabled, which can allow a user (e.g., a news anchor) to interact with the election data. To facilitate the user's interaction with the election data, the display device and/or other components of the election system 306 can be programmed with instructions that cause particular actions to be performed in response to particular touch commands.

The scheduling system 312 can perform various acts and/or functions related to the scheduling of video content production. For example, the scheduling system 312 can create and/or modify a program schedule of a video program, perhaps based on input received from a user via a user interface. Further, the scheduling system 312 can store and/or retrieve a program schedule, perhaps based on input received from a user via a user interface. As such, the scheduling system 312 can store a program schedule in a data storage unit (e.g., a data storage unit of the scheduling system 312), and can then receive the program schedule by selecting and retrieving it from the data storage unit. The scheduling system 312 can also transmit a program schedule to another entity, such as the sequencing system 314.

The sequencing system 314 can process records in the program schedule. This can cause the sequencing system 314 to control one or more other components of the VPS 202 to facilitate the VPS 202 generating and/or outputting video content, which can serve as or be part of a video program. For example, the sequencing system 314 can control the video source 302, the election system 306, the character generator 308, and/or the DVE system 310 to perform the various acts and/or functions described in this disclosure.

The sequencing system 314 can receive a program schedule in various ways. For example, the sequencing system 314 can do so by receiving it from another entity, such as the scheduling system 312. In another example, the sequencing system 314 can do so by selecting and retrieving it from a data storage unit (e.g., a data storage unit of the scheduling system 312).

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. In some cases, each record can also include one or more sub-records. Each record (including a sub-record) can include various types of data.

FIG. 5 is a simplified diagram of an example program schedule 500. The program schedule 500 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video content item identifier, a duration, and a DVE identifier (which can serve as an instruction to execute the identified DVE).

A video content item can consist of logically-related video content. For example, a video content item can be a commercial. As another example, a video content item can be a portion of a television program that is scheduled between two commercial breaks. This is sometimes referred to in the industry as a "program segment."

As shown in FIG. 5, the first record specifies a story title of STORY A, a video content identifier of VCI ID A, a duration of 00:02:00:00 (in hours::minutes::seconds::frames format), and a DVE identifier of DVE ID A. As such, upon the sequencing system 314 processing the first record, the sequencing system 314 can cause the video source 302 to playout a video content item identified by the identifier VCI ID A for two minutes, and can further cause the DVE system 310 to execute a DVE identified by the identifier DVE ID A, which for example, can cause the DVE system 310 to overlay content on the identified video-content item.

The program schedule 500 has been greatly simplified for the purposes of illustrating certain features. In practice, a program schedule is likely to include significantly more data.

In some instances, the sequencing system 314 can process a next record in the program schedule based on a trigger event. In one example, the trigger event can be the sequencing system 314 completing one or more actions related to a current record in the program schedule. In another example, the trigger event can be the sequencing system 314 receiving input from a user via a user interface.

Referring back to FIG. 2, the VBS 204 can receive video content from the VPS 202, which in turn can transmit the video content to the end-user device 206 for presentation of the video content to an end user. In practice, the VBS 204 can transmit video content to a large number of end-user devices for presentation of the video content to a large number of end users. The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

FIGS. 6A-6D are simplified diagrams of example content data that can be accessed by a DVE system or a character generator. For example, the election system 306, or some other system of the VPS 202, can provide the content data to the character generator 308, and the character generator 308 can then generate video content based on the content data. The content data can take various forms, such as the form of an XML file.

As shown in FIG. 6A, the example content data 600 includes twelve ordered content items, but in other examples the content data can include additional or fewer content items. As further shown, the example content data 600 includes two different types of content items, but in other examples the content data can include additional or fewer types of content items. The content data 600 includes content items of a first type (content items A-E) and content items of a second type (content items A'-E'). As shown, the content data 600 alternates between content items of the first type and content items of the second type. However, other arrangements are possible as well (e.g., two content items of the first type followed by one content item of the second type, or the like). The content items of the first type can include election data from the election system 306, while the content items of the second type can include advertisement content. Other examples are possible as well.

Each content item of the content data 600 can correspond to respective data that may or may not be included in video content generated by the character generator 308. For example, the character generator 308 can generate video content that includes some or all of the content items. The generated video content can include the content items in the sequential order in which they are arranged in the content data 600. The generated video content can take various forms, such as a scrolling ticker, a list, a table, or some other video content that presents the content items in their sequential order.

In some examples, the character generator 308 can be configured to generate video content that includes all of the content items of the content data 600. For instance, the character generator 308 can generate a ticker that first presents content item A, followed by content item A', followed by content item B, and so on. Once the generated video content presents content item F', the ticker can repeat the sequence starting with content item A again. In such examples, in order to remove a particular content item from the generated video content, that particular content item can be removed from the content data 600 (e.g., by removing a row from the XML file). Similarly, in order to add a particular content item to the generated video content, that particular content item can be added to the content data 600 (e.g., by adding a row to the XML file).

However, adding or removing content items to and from the content data 600 can have undesirable consequences, such as causing the character generator 308 to restart generation of the video content starting with content item A. This may be problematic if the content data 600 is altered (e.g., by adding or removing a content item) while the generated video content presents some intermediate content item between content items A and F'. For example, if the character generator 308 generates a ticker that sequentially presents content items A through F', and a content item is added to or removed from the content data 600 while the ticker presents content item D, then the character generator 308 will restart generation of the video content such that the ticker restarts the sequential presentation with content item A before content items D' through F' have been presented.

In order to modify which content items are included or excluded from the generated video content without adding or removing content items from the content data 600, the content data 600 can include a set of active/inactive status attributes, as further shown in FIG. 6A. Each of the content items corresponds with a respective active/inactive status attribute, and the character generator 308 can be configured to include or exclude a content item from the generated video content based on the respective active/inactive status attribute of each content item. For example, content items corresponding to an "active" status attribute can be included in the generated video content, while content items corresponding to an "inactive" status attribute can be excluded from the generated video content. As shown, the character generator 308 can generate video content that includes content items A, B, B', C, D, E, F, and F' and excludes content items A', C', D' and E'.

In this manner, a particular content item can be added to or removed from the generated video content by modifying the status attribute corresponding to the particular content item. For example, changing the status attribute of content item A from "active" to "inactive" would cause the character generator 308 to exclude content item A from the generated video content. Similarly, changing the status attribute of content item D' from "inactive" to "active," as shown in FIG. 6B, would cause the character generator 308 to include content item D' in the generated video content.

Further, because the modification of a particular content item's status attribute does not involve adding or removing a content item from the content data 600, such a modification does not cause the character generator 308 to restart the generated video content at the beginning of the sequential order of content items.

Figure 7:
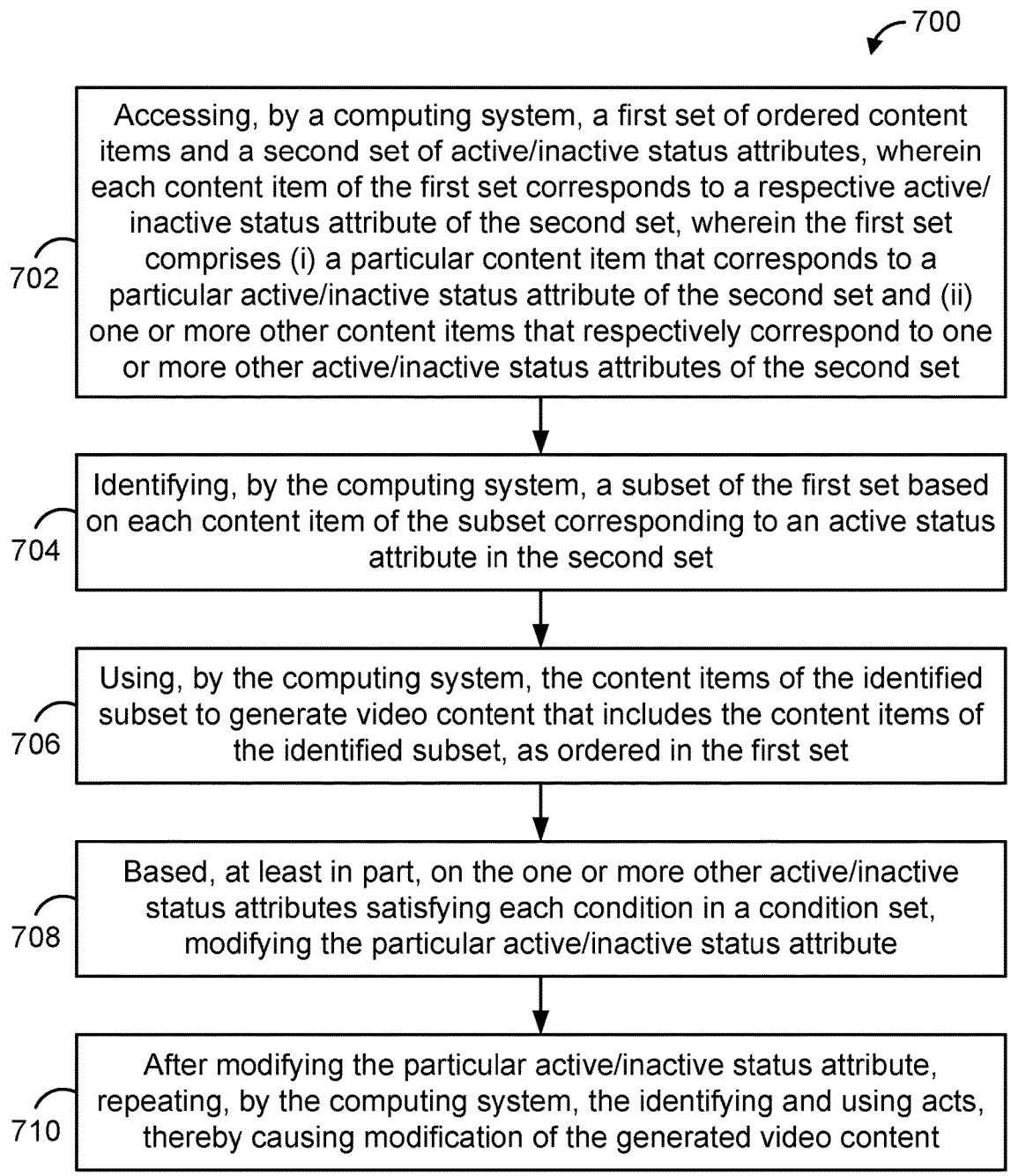
FIG. 7 is a flow chart of an example method.

FIG. 7 is a flow chart illustrating an example method 700. At block 702, the method 700 can include accessing, by a computing system, a first set of ordered content items and a second set of active/inactive status attributes, wherein each content item of the first set corresponds to a respective active/inactive status attribute of the second set, and wherein the first set comprises (i) a particular content item that corresponds to a particular active/inactive status attribute of the second set and (ii) one or more other content items that respectively correspond to one or more other active/inactive status attributes of the second set.

As discussed above, each content item of the first set can be a particular type of content item. For instance, a content item can be of a first type that includes data associated with an election. To facilitate this, as noted above, the election system 306 can receive, select, and/or retrieve election data, such as a title of a political office that is the subject of the election, a name and other information of a candidate, an amount of votes cast and/or tabulated for a candidate, an amount and an identification of precincts or other zones reporting tabulated votes, and/or a projection outcome. The election system 306 can store the election data and/or associated data in a data storage unit as one or more content items of the first set, and these content items can each be associated with a respective active/inactive status attribute.

Additionally, a content item can be of a second type that includes advertisement data. For instance, a content item could include an image and/or text designed to promote various sponsored content or other products or services. As with the election data, the advertisement data can be stored in a data storage unit as one or more content items of the first set, and these content items can each correspond with a respective active/inactive status attribute. Further, as discussed above with respect to FIG. 6A, these content items and status attributes can be stored in various forms, such as in the form of an XML file.

The content items and their corresponding active/inactive status attributes can also be transmitted to the character generator 308. The character generator template can specify that the character generator 308 is to receive the content items and their status attributes from the election system 306 or that the character generator 308 is to retrieve them from a data storage unit of the election system 306.

At block 704, the method 700 can include identifying, by the computing system, a subset of the first set based on each content item of the subset corresponding to an active status attribute in the second set. The character generator 308, for instance, can determine for each content item of the first set, whether its corresponding active/inactive status attribute of the second set is indicative of an active status.

At block 706, the method 700 can include using, by the computing system, the content items of the identified subset to generate video content that includes the content items of the identified subset, as ordered in the first set. As such, the generated video content can include content items associated with a respective active status attribute and exclude content items associated with a respective inactive status attribute.

In line with the discussion above, the character generator 308 can use the content items of the identified subset (i.e., content items associated with an active status attribute) to generate video content that includes the content items in their specified order, such as in the form of a ticker. As such, the generated video content can present the content items of the identified subset in a scrolling or rotating fashion. For example, where the identified subset of content items includes data associated with an election as well as advertisement data, the generated video content can include a ticker that presents a scrolling or rotating display of various candidate names and their respective vote counts or vote count percentages with advertisements intermixed with the election data. Other examples are possible as well.

At block 708, the method 700 can include, based at least in part on the one or more other active/inactive status attributes satisfying each condition in a condition set, modifying the particular active/inactive status attribute.

This modifying of the active/inactive status attribute can be advantageous in examples where some of the content items of the first set include advertisement data, as it can be desirable to dynamically control where advertisements are included in the generated video content. For instance, it can be desirable to include or exclude a particular advertisement content item from the generated video content based on a number of non-advertisement content items or other advertisement content items included in the generate video content data, as well as on the order of those non-advertisement content items or other advertisement content items in the first set relative to the particular advertisement content item.

Further, it can be particularly desirable to dynamically control whether certain advertisements are included in the generated video content if the non-advertisement content items include election data from an ongoing election. For instance, during an election, certain election data content items can be dynamically included or excluded from the generated video content based on a current total vote count for a particular candidate or issue, an expected outcome of an election, voter turnout, viewer interest in a particular candidate or issue, and/or whether a candidate has dropped out of the election, among other factors. As these election data content items are dynamically included or excluded, it can also be desirable to dynamically include or exclude certain advertisement content items in order to maintain an appropriate balance and order of advertisement content items relative to non-advertisement content items.

Accordingly, in some examples, the first set of ordered content items can include both (i) content items of a first type (e.g., election data content items) and (ii) content items of a second type (e.g., advertisement content items), the particular content item can be of the second type, and modifying the particular active/inactive status attribute can include setting the particular active/inactive status attribute as an active status attribute.

In one such example, the condition set for setting the particular active/inactive status attribute as an active status attribute can include a condition that at least a threshold number of the other active/inactive status attributes are active status attributes that respectively correspond to other content items of the first type. In some instances, if this condition is satisfied, this may indicate that a significantly high number of non-advertisement content items are included in the generated video content, such that additional advertisement content items should also be included in the generated video content.

In another example, the condition set for setting the particular active/inactive status attribute as an active status attribute can include a condition that at least a threshold number of the other active/inactive status attributes are inactive status attributes that correspond to other content items of the second type. In some instances, if this condition is satisfied, this may indicate that a significantly high number of advertisement content items are excluded from the generated video content, such that additional advertisement content items should be included in the generated video content.

In another example, the condition set for setting the particular active/inactive status attribute as an active status attribute can include a condition that less than a threshold number of the other active/inactive status attributes are inactive status attributes that respectively correspond to other content items of the first type. In some instances, if this condition is satisfied, this may indicate that a significantly low number of non-advertisement content items are excluded from the generated video content. This, in turn, may indicate that a significantly high number of non-advertisement items are included in the generated video content, such that additional advertisement content items should also be included in the generated video content.

In another example, the condition set for setting the particular active/inactive status attribute as an active status attribute can include a condition that less than a threshold number of the other active/inactive status attributes are active status attributes that respectively correspond to other content items of the second type. In some instances, if this condition is satisfied, this may indicate that a significantly low number of advertisement content items are included in the generated video content, such that additional advertisement content items should be included in the generated video content.

In another example, the condition set for setting the particular active/inactive status attribute as an active status attribute can include a condition that at least a threshold number of the other active/inactive status attributes are both (i) active status attributes that respectively correspond to other content items of the first type and (ii) positioned in the second set between the particular active/inactive status attribute and an active status attribute that corresponds to an other content item of the second type. In some instances, if this condition is satisfied, this may indicate that a significantly high number of non-advertisement content items are consecutively included in the generated video content, such that an additional advertisement content item should be included in the generated video content in order to reduce the number of consecutive included non-advertisement content items.

In another example, the condition set for setting the particular active/inactive status attribute as an active status attribute can include a condition that at least a threshold number of the other active/inactive status attributes are both (i) inactive status attributes that respectively correspond to other content items of the second type and (ii) positioned in the second set between the particular active/inactive status attribute and an active status attribute that corresponds to an other content item of the second type. In some instances, if this condition is satisfied, this may indicate that a significantly high number of advertisement content items are consecutively excluded from the generated video content, such that an additional advertisement content item should be included in the generated video content in order to reduce the number of consecutive excluded advertisement content items.

In another example, the condition set for setting the particular active/inactive status attribute as an active status attribute can include a condition that less than a threshold number of the other active/inactive status attributes are both (i) inactive status attributes that respectively correspond to other content items of the first type and (ii) positioned in the second set between the particular active/inactive status attribute and an active status attribute that corresponds to an other content item of the second type. In some instances, if this condition is satisfied, this may indicate that a significantly low number of non-advertisement content items that are positioned between active advertisements are excluded from the generated video content. This, in turn, may indicate that a significantly high number of non-advertisement content items that are positioned between active advertisements are included in the generated video content, such that an additional advertisement content item should be included in the generated video content in order to reduce the number of non-advertisement content items positioned between the active advertisements.

In another example, the condition set for setting the particular active/inactive status attribute as an active status attribute can include a condition that less than a threshold number of the other active/inactive status attributes are both (i) active status attributes that respectively correspond to other content items of the second type and (ii) positioned in the second set between the particular active/inactive status attribute and an active status attribute that corresponds to an other content item of the second type. In some instances, if this condition is satisfied, this may indicate that a significantly low number of advertisement content items that are positioned between active advertisements are included in the generated video content, such that an additional advertisement content item should be included in the generated video content in order to increase the number of advertisement content items positioned between the active advertisements.

Other examples of conditions for setting the particular active/inactive status attribute as an active status attribute are possible as well.

Moreover, in some examples, the first set of ordered content items can include both (i) content items of a first type (e.g., election data content items) and (ii) content items of a second type (e.g., advertisement content items), the particular content item can be of the second type, and modifying the particular active/inactive status attribute can include setting the particular active/inactive status attribute as an inactive status attribute.

In one such example, the condition set for setting the particular active/inactive status attribute as an inactive status attribute can include a condition that less than a threshold number of the other active/inactive status attributes are active status attributes that respectively correspond to other content items of the first type. In some instances, if this condition is satisfied, this may indicate that a significantly low number of non-advertisement content items are included in the generated video content, such that fewer advertisement content items should be included in the generated video content.

In another example, the condition set for setting the particular active/inactive status attribute as an inactive status attribute can include a condition that less than a threshold number of the other active/inactive status attributes are inactive status attributes that respectively correspond to other content items of the second type. In some instances, if this condition is satisfied, this may indicate that a significantly low number of advertisement content items are excluded from the generated video content, such that additional advertisement content items should be excluded from the generated video content.

In another example, the condition set for setting the particular active/inactive status attribute as an inactive status attribute can include a condition that at least a threshold number of the other active/inactive status attributes are inactive status attributes that respectively correspond to other content items of the first type. In some instances, if this condition is satisfied, this may indicate that a significantly high number of non-advertisement content items are excluded from the generated video content. This, in turn, may indicate that a significantly low number of non-advertisement items are included in the generated video content, such that fewer advertisement content items should be included in the generated video content.

In another example, the condition set for setting the particular active/inactive status attribute as an inactive status attribute can include a condition that at least a threshold number of the other active/inactive status attributes are active status attributes that respectively correspond to other content items of the second type. In some instances, if this condition is satisfied, this may indicate that a significantly high number of advertisement content items are included in the generated video content, such that fewer advertisement content items should be included in the generated video content.

In another example, the condition set for setting the particular active/inactive status attribute as an inactive status attribute can include a condition that less than a threshold number of the other active/inactive status attributes are both (i) active status attributes that respectively correspond to other content items of the first type and (ii) positioned in the second set between the particular active/inactive status attribute and an active status attribute that corresponds to an other content item of the second type. In some instances, if this condition is satisfied, this may indicate that a significantly low number of non-advertisement content items are consecutively included in the generated video content, such that the particular advertisement content item should be excluded from the generated video content in order to increase the number of consecutive included non-advertisement content items.

In another example, the condition set for setting the particular active/inactive status attribute as an inactive status attribute can include a condition that less than a threshold number of the other active/inactive status attributes are both (i) inactive status attributes that respectively correspond to other content items of the second type and (ii) positioned in the second set between the particular active/inactive status attribute and an active status attribute that corresponds to an other content item of the second type. In some instances, if this condition is satisfied, this may indicate that a significantly low number of advertisement content items are consecutively excluded from the generated video content, such that the particular advertisement content item should be exclude from the generated video content in order to increase the number of consecutive excluded advertisement content items.

In another example, the condition set for setting the particular active/inactive status attribute as an inactive status attribute can include a condition that at least a threshold number of the other active/inactive status attributes are both (i) inactive status attributes that respectively correspond to other content items of the first type and (ii) positioned in the second set between the particular active/inactive status attribute and an active status attribute that corresponds to an other content item of the second type. In some instances, if this condition is satisfied, this may indicate that a significantly high number of non-advertisement content items that are positioned between active advertisements are excluded from the generated video content. This, in turn, may indicate that a significantly low number of non-advertisement content items that are positioned between active advertisements are included in the generated video content, such that the particular advertisement content item should be excluded from the generated video content in order to increase the number of included non-advertisement content items positioned between the active advertisements.

In another example, the condition set for setting the particular active/inactive status attribute as an inactive status attribute can include a condition that at least a threshold number of the other active/inactive status attributes are both (i) active status attributes that respectively correspond to other content items of the second type and (ii) positioned in the second set between the particular active/inactive status attribute and an active status attribute that corresponds to an other content item of the second type. In some instances, if this condition is satisfied, this may indicate that a significantly high number of advertisement content items that are positioned between active advertisements are included in the generated video content, such that the particular advertisement content item should be excluded from the generated video content in order to reduce the number of advertisement content items positioned between the active advertisements.

Other examples of conditions for setting the particular active/inactive status attribute as an inactive status attribute are possible as well.

At block 710, the method 700 can include, after modifying the particular active/inactive status attribute, repeating, by the computing system, the identifying and using acts, thereby causing modification of the generated video content. As described above with respect to blocks 704 and 706, the character generator 308 can generate video content that includes content items associated with an active status attribute and excludes content items associated with an inactive status attribute. As such, modifying the particular active/inactive status attribute of the particular content item can cause the particular content item to be included in or excluded from the generated video content.

Referring back to FIGS. 6A and 6B, examples of using one or more of the above conditions for setting the particular active/inactive status attribute as an active status attribute are shown. For instance, FIG. 6A shows the example content data 600 with content items A, B, B', C, D, E, F, and F' corresponding to active status attributes and content items A', C', D', and E' corresponding to inactive status attributes. Based on one or more of the above conditions, the election system 306 can modify the content data 600 to set the status attribute corresponding to content item D' as an active status attribute, as shown by the modified content data 610 in FIG. 6B.

For instance, where content items A-F are non-advertisement content items (e.g., content items including respective election data) and content items A'-F' are advertisement content items, the VPS 202 can be configured to modify the content data 600 such that advertisement content items are only included in the generated video after a threshold number of non-advertisement content items have been included in the generated video. In one example, the VPS 202 can be configured to include two non-advertisement content items for every one advertisement content item. In particular, the VPS 202 can be configured to include a repeating sequence of two non-advertisement content items followed by one advertisement content item. However, using the content data 600 shown in FIG. 6A, the character generator 308 would generate video content including the content items in the following order: A, B, B', C, D, E, F, F'. This generated video content includes four consecutive non-advertisement content items (C, D, E, and F) between advertisement content items B' and F'. Accordingly, the VPS 202 can modify the content data 600 to set the status attribute corresponding to advertisement content item D' as an active status attribute, as shown by the modified content data 610 in FIG. 6B. The character generator 308 can then use the modified content data 610 to generate video content in the following order: A, B, B', C, D, D', E, F, F', such that the generated video content includes a repeating sequence of two non-advertisement content items followed by one advertisement content item. Other examples are possible as well.

Similarly, referring to FIGS. 6C and 6D, examples of using one or more of the above conditions for setting the particular active/inactive status attribute as an inactive status attribute are shown. For instance, FIG. 6C shows the example content data 620 with content items A, B, B', C, C', D, D', E, F, and F' corresponding to active status attributes and content items A' and E' corresponding to inactive status attributes. Based on one or more of the above conditions, the election system 306 can modify the content data 620 to set the status attribute corresponding to content item C' as an inactive status attribute, as shown by the modified content data 630 in FIG. 6D.

For instance, where content items A-F are non-advertisement content items (e.g., content items including respective election data) and content items A'-F' are advertisement content items, the VPS 202 can be configured to modify the content data 620 such that advertisement content items are only included in the generated video after a threshold number of non-advertisement content items have been included in the generated video content. In one example, the VPS 202 can be configured to include two non-advertisement content items in the generated video content for every advertisement content item. In particular, the VPS 202 can be configured to include a repeating sequence of two non-advertisement content items followed by one advertisement content item. However, using the content data 620 shown in FIG. 6C, the character generator 308 would generate video content including the content items in the following order: A, B, B', C, C', D, D', E, F, F'. This generated video content includes only one non-advertisement content item (C) between advertisement content items B' and C' and only one non-advertisement content item (D) between advertisement content items C' and D'. Accordingly, the VPS 202 can modify the content data 620 to set the status attribute corresponding to advertisement content item C' as an inactive status attribute, as shown by the modified content data 630 in FIG. 6D. The character generator 308 can then use the modified content data 630 to generate video content in the following order: A, B, B', C, D, D', E, F, F', such that the generated video content includes a repeating sequence of two non-advertisement content items followed by one advertisement content item. Other examples are possible as well.

Based at least in part on the determination, while the video content is being generated by the character generator 308, the election system 306 can modify the particular active/inactive status attribute of the particular content item. As such, the particular active/inactive status attribute can be modified in various circumstances. For example, the particular active/inactive status attribute can be modified from "active" to "inactive" if a vote count associated with the content item is significantly low, if the election associated with the content item is significantly lopsided, if a projection of the election associated with the content item is significantly inaccurate, if a candidate associated with the content item has dropped out of the election, or if the voter turnout of the race associated with the content item is significantly low. Further, the particular active/inactive status attribute can be modified if the content item is associated with a particular race, candidate, or location. Other examples are possible as well.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   accessing, by a computing system, a first set of ordered content items and a second set of active/inactive status attributes, wherein each content item of the first set corresponds to a respective active/inactive status attribute of the second set, wherein the first set comprises (i) a particular content item that corresponds to a particular active/inactive status attribute of the second set and (ii) other content items that correspond to other active/inactive status attributes of the second set;
   identifying, by the computing system, a subset of the first set based on each content item of the subset corresponding to an active status attribute in the second set;
   using, by the computing system, the content items of the identified subset to generate video content that includes the content items of the identified subset, as ordered in the first set;
   while generating the video content, modifying, by the computing system, the particular active/inactive status attribute based on at least one of (i) a threshold number of the other active/inactive status attributes or (ii) a position of the other active/inactive status attributes relative to the particular active/inactive status attribute; and
   after modifying the particular active/inactive status attribute, repeating, by the computing system, the identifying and using steps, thereby causing modification of the generated video content.

2. The method of claim 1, wherein the first set of ordered content items comprises both (i) content items of a first type and (ii) content items of a second type, and wherein the particular content item is of the second type.

3. The method of claim 2, wherein modifying the particular active/inactive status attribute comprises setting the particular active/inactive status attribute as an active status attribute based on at least one condition from the group consisting of:
   a first condition that at least the threshold number of the other active/inactive status attributes are active status attributes that correspond to other content items of the first type;
   a second condition that at least the threshold number of the other active/inactive status attributes are inactive status attributes that correspond to other content items of the second type;
   a third condition that at most the threshold number of the other active/inactive status attributes are inactive status attributes that correspond to other content items of the first type;

a fourth condition that at most the threshold number of the other active/inactive status attributes are active status attributes that correspond to other content items of the second type;
a fifth condition that at least the threshold number of the other active/inactive status attributes are both (i) active status attributes that correspond to other content items of the first type and (ii) positioned in the second set between the particular active/inactive status attribute and an active status attribute that corresponds to an other content item of the second type;
a sixth condition that at least the threshold number of the other active/inactive status attributes are both (i) inactive status attributes that correspond to other content items of the second type and (ii) positioned in the second set between the particular active/inactive status attribute and an active status attribute that corresponds to an other content item of the second type;
a seventh condition that at most the threshold number of the other active/inactive status attributes are both (i) inactive status attributes that correspond to other content items of the first type and (ii) positioned in the second set between the particular active/inactive status attribute and an active status attribute that corresponds to an other content item of the second type; and
an eighth condition that at most the threshold number of the other active/inactive status attributes are both (i) active status attributes that correspond to other content items of the second type and (ii) positioned in the second set between the particular active/inactive status attribute and an active status attribute that corresponds to an other content item of the second type.

4. The method of claim 2, wherein modifying the particular active/inactive status attribute comprises setting the particular active/inactive status attribute as an inactive status attribute based on at least one condition from the group consisting of:
a first condition that at most the threshold number of the other active/inactive status attributes are active status attributes that correspond to other content items of the first type;
a second condition that at most the threshold number of the other active/inactive status attributes are inactive status attributes that correspond to other content items of the second type;
a third condition that at least the threshold number of the other active/inactive status attributes are inactive status attributes that correspond to other content items of the first type;
a fourth condition that at least the threshold number of the other active/inactive status attributes are active status attributes that correspond to other content items of the second type;
a fifth condition that at most the threshold number of the other active/inactive status attributes are both (i) active status attributes that correspond to other content items of the first type and (ii) positioned in the second set between the particular active/inactive status attribute and an active status attribute that corresponds to an other content item of the second type;
a sixth condition that at most the threshold number of the other active/inactive status attributes are both (i) inactive status attributes that correspond to other content items of the second type and (ii) positioned in the second set between the particular active/inactive status attribute and an active status attribute that corresponds to an other content item of the second type;
a seventh condition that at least the threshold number of the other active/inactive status attributes are both (i) inactive status attributes that correspond to other content items of the first type and (ii) positioned in the second set between the particular active/inactive status attribute and an active status attribute that corresponds to an other content item of the second type; and
an eighth condition that at least the threshold number of the other active/inactive status attributes are both (i) active status attributes that correspond to other content items of the second type and (ii) positioned in the second set between the particular active/inactive status attribute and an active status attribute that corresponds to an other content item of the second type.

5. The method of claim 2, wherein each content item of the first type comprises respective content associated with an election and each content item of the second type comprises respective advertisement content.

6. The method of claim 1, wherein a character generator uses the content items of the identified subset to generate the video stream representing video content.

7. The method of claim 1, wherein the generated video content presents the content items of the identified subset in a scrolling or rotating fashion.

8. The method of claim 1, further comprising:
transmitting the generated video content to an end-user device for presentation of the video content to an end-user.

9. A non-transitory computer-readable medium having stored thereon program instructions that, when executed by a processor, cause performance of a set of acts comprising:
accessing, by a computing system, a first set of ordered content items and a second set of active/inactive status attributes, wherein each content item of the first set corresponds to a respective active/inactive status attribute of the second set, wherein the first set comprises (i) a particular content item that corresponds to a particular active/inactive status attribute of the second set and (ii) other content items that correspond to other active/inactive status attributes of the second set;
identifying, by the computing system, a subset of the first set based on each content item of the subset corresponding to an active status attribute in the second set;
using, by the computing system, the content items of the identified subset to generate video content that includes the content items of the identified subset, as ordered in the first set;
while generating the video content, modifying, by the computing system, the particular active/inactive status attribute based on at least one of (i) a quantity threshold number of the other active/inactive status attributes or (ii) a position of the other active/inactive status attributes relative to the particular active/inactive status attribute; and
after modifying the particular active/inactive status attribute, repeating, by the computing system, the identifying and using steps, thereby causing modification of the generated video content.

10. The computer-readable medium of claim 9, wherein the first set of ordered content items comprises both (i) content items of a first type and (ii) content items of a second type, and wherein the particular content item is of the second type.

11. The computer-readable medium of claim 10, wherein modifying the particular active/inactive status attribute comprises setting the particular active/inactive status attribute as an active status attribute based on at least one condition from the group consisting of:
- a first condition that at least the threshold number of the other active/inactive status attributes are active status attributes that correspond to other content items of the first type;
- a second condition that at least the threshold number of the other active/inactive status attributes are inactive status attributes that correspond to other content items of the second type;
- a third condition that at most the threshold number of the other active/inactive status attributes are inactive status attributes that correspond to other content items of the first type;
- a fourth condition that at most the threshold number of the other active/inactive status attributes are active status attributes that correspond to other content items of the second type;
- a fifth condition that at least the threshold number of the other active/inactive status attributes are both (i) active status attributes that correspond to other content items of the first type and (ii) positioned in the second set between the particular active/inactive status attribute and an active status attribute that corresponds to an other content item of the second type;
- a sixth condition that at least the threshold number of the other active/inactive status attributes are both (i) inactive status attributes that correspond to other content items of the second type and (ii) positioned in the second set between the particular active/inactive status attribute and an active status attribute that corresponds to an other content item of the second type;
- a seventh condition that at most the threshold number of the other active/inactive status attributes are both (i) inactive status attributes that correspond to other content items of the first type and (ii) positioned in the second set between the particular active/inactive status attribute and an active status attribute that corresponds to an other content item of the second type; and
- an eighth condition that at most the threshold number of the other active/inactive status attributes are both (i) active status attributes that correspond to other content items of the second type and (ii) positioned in the second set between the particular active/inactive status attribute and an active status attribute that corresponds to an other content item of the second type.

12. The computer-readable medium of claim 10, wherein modifying the particular active/inactive status attribute comprises setting the particular active/inactive status attribute as an inactive status attribute based on at least one condition from the group consisting of:
- a first condition that at most the threshold number of the other active/inactive status attributes are active status attributes that correspond to other content items of the first type;
- a second condition that at most the threshold number of the other active/inactive status attributes are inactive status attributes that correspond to other content items of the second type;
- a third condition that at least the threshold number of the other active/inactive status attributes are inactive status attributes that correspond to other content items of the first type;
- a fourth condition that at least the threshold number of the other active/inactive status attributes are active status attributes that correspond to other content items of the second type;
- a fifth condition that at most the threshold number of the other active/inactive status attributes are both (i) active status attributes that correspond to other content items of the first type and (ii) positioned in the second set between the particular active/inactive status attribute and an active status attribute that corresponds to an other content item of the second type;
- a sixth condition that at most the threshold number of the other active/inactive status attributes are both (i) inactive status attributes that correspond to other content items of the second type and (ii) positioned in the second set between the particular active/inactive status attribute and an active status attribute that corresponds to an other content item of the second type;
- a seventh condition that at least the threshold number of the other active/inactive status attributes are both (i) inactive status attributes that correspond to other content items of the first type and (ii) positioned in the second set between the particular active/inactive status attribute and an active status attribute that corresponds to an other content item of the second type; and
- an eighth condition that at least the threshold number of the other active/inactive status attributes are both (i) active status attributes that correspond to other content items of the second type and (ii) positioned in the second set between the particular active/inactive status attribute and an active status attribute that corresponds to an other content item of the second type.

13. The computer-readable medium of claim 10, wherein each content item of the first type comprises respective content associated with an election and each content item of the second type comprises respective advertisement content.

14. The computer-readable medium of claim 9, wherein the generated video content presents the content items of the identified subset in a scrolling or rotating fashion.

15. A computing system comprising:
one or more processors; and
a non-transitory computer-readable medium having stored thereon program instructions that, upon execution by the one or more processors, cause the computing system to perform a set of acts comprising:
accessing a first set of ordered content items and a second set of active/inactive status attributes, wherein each content item of the first set corresponds to a respective active/inactive status attribute of the second set, wherein the first set comprises (i) a particular content item that corresponds to a particular active/inactive status attribute of the second set and (ii) other content items that correspond to other active/inactive status attributes of the second set;
identifying a subset of the first set based on each content item of the subset corresponding to an active status attribute in the second set;
using, by the computing system, the content items of the identified subset to generate video content that includes the content items of the identified subset, as ordered in the first set;
while generating the video content, modifying the particular active/inactive status attribute based on at least one of (i) a threshold number of the other active/inactive status attributes or (ii) a position of the other active/inactive status attributes relative to the particular active/inactive status attribute; and after modifying the particular active/inactive status attribute, repeating the identifying and using steps, thereby causing modification of the generated video content.

16. The system of claim 15, wherein the first set of ordered content items comprises both (i) content items of a first type and (ii) content items of a second type, and wherein the particular content item is of the second type.

17. The system of claim 16, wherein modifying the particular active/inactive status attribute comprises setting the particular active/inactive status attribute as an active status attribute based on at least one condition from the group consisting of:
- a first condition that at least the threshold number of the other active/inactive status attributes are active status attributes that correspond to other content items of the first type;
- a second condition that at least the threshold number of the other active/inactive status attributes are inactive status attributes that correspond to other content items of the second type;
- a third condition that at most the threshold number of the other active/inactive status attributes are inactive status attributes that correspond to other content items of the first type;
- a fourth condition that at most the threshold number of the other active/inactive status attributes are active status attributes that correspond to other content items of the second type;
- a fifth condition that at least the threshold number of the other active/inactive status attributes are both (i) active status attributes that correspond to other content items of the first type and (ii) positioned in the second set between the particular active/inactive status attribute and an active status attribute that corresponds to an other content item of the second type;
- a sixth condition that at least the threshold number of the other active/inactive status attributes are both (i) inactive status attributes that correspond to other content items of the second type and (ii) positioned in the second set between the particular active/inactive status attribute and an active status attribute that corresponds to an other content item of the second type;
- a seventh condition that at most the threshold number of the other active/inactive status attributes are both (i) inactive status attributes that correspond to other content items of the first type and (ii) positioned in the second set between the particular active/inactive status attribute and an active status attribute that corresponds to an other content item of the second type; and
- an eighth condition that at most the threshold number of the other active/inactive status attributes are both (i) active status attributes that correspond to other content items of the second type and (ii) positioned in the second set between the particular active/inactive status attribute and an active status attribute that corresponds to an other content item of the second type.

18. The system of claim 16, wherein modifying the particular active/inactive status attribute comprises setting the particular active/inactive status attribute as an inactive status attribute based on at least one condition from the group consisting of:
- a first condition that at most the threshold number of the other active/inactive status attributes are active status attributes that correspond to other content items of the first type;
- a second condition that at most the threshold number of the other active/inactive status attributes are inactive status attributes that correspond to other content items of the second type;
- a third condition that at least the threshold number of the other active/inactive status attributes are inactive status attributes that correspond to other content items of the first type;
- a fourth condition that at least the threshold number of the other active/inactive status attributes are active status attributes that correspond to other content items of the second type;
- a fifth condition that at most the threshold number of the other active/inactive status attributes are both (i) active status attributes that correspond to other content items of the first type and (ii) positioned in the second set between the particular active/inactive status attribute and an active status attribute that corresponds to an other content item of the second type;
- a sixth condition that at most the threshold number of the other active/inactive status attributes are both (i) inactive status attributes that correspond to other content items of the second type and (ii) positioned in the second set between the particular active/inactive status attribute and an active status attribute that corresponds to an other content item of the second type;
- a seventh condition that at least the threshold number of the other active/inactive status attributes are both (i) inactive status attributes that correspond to other content items of the first type and (ii) positioned in the second set between the particular active/inactive status attribute and an active status attribute that corresponds to an other content item of the second type; and
- an eighth condition that at least the threshold number of the other active/inactive status attributes are both (i) active status attributes that correspond to other content items of the second type and (ii) positioned in the second set between the particular active/inactive status attribute and an active status attribute that corresponds to an other content item of the second type.

19. The system of claim 16, wherein each content item of the first type comprises respective content associated with an election and each content item of the second type comprises respective advertisement content.

20. The system of claim 15, wherein the generated video content presents the content items of the identified subset in a scrolling or rotating fashion.

* * * * *

UNITED STATES PATENT AND TRADEMARK OFFICE
CERTIFICATE OF CORRECTION

PATENT NO. : 10,433,018 B2  
APPLICATION NO. : 15/450225  
DATED : October 1, 2019  
INVENTOR(S) : David McFerrin Page 1 of 1

It is certified that error appears in the above-identified patent and that said Letters Patent is hereby corrected as shown below:

In the Claims

In Claim 9, at Column 22, Line 52, please delete "quantity".

Signed and Sealed this  
Seventeenth Day of December, 2019

Andrei Iancu  
*Director of the United States Patent and Trademark Office*